US012780336B2

(12) United States Patent
Wang et al.

(10) Patent No.: US 12,780,336 B2
(45) Date of Patent: Nov. 3, 2026

(54) OBSTACLE-SURMOUNTING WALKING DEVICE

(71) Applicant: DALIAN UNIVERSITY OF TECHNOLOGY, Dalian City (CN)

(72) Inventors: Xiaoxu Wang, Dalian City (CN); Jinglong Wang, Dalian City (CN); Hui Liu, Dalian City (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 331 days.

(21) Appl. No.: 18/763,241

(22) Filed: Jul. 3, 2024

(65) Prior Publication Data

US 2025/0206392 A1 Jun. 26, 2025

(30) Foreign Application Priority Data

Dec. 20, 2023 (CN) ......................... 202311759972.4

(51) Int. Cl.
*B62D 57/024* (2006.01)
*B62D 57/028* (2006.01)

(52) U.S. Cl.
CPC ......... *B62D 57/024* (2013.01); *B62D 57/028* (2013.01)

(58) Field of Classification Search
CPC .. B62D 57/024; B62D 57/028; B62D 55/075; A62G 5/061; B60B 11/02; B60B 19/00; B60B 2900/551; F16D 3/10; F16D 4/00; F16H 2055/176; F16H 55/17; B60K 2007/0061
USPC ........................................................ 180/8.2
See application file for complete search history.

(56) References Cited

U.S. PATENT DOCUMENTS 4,262,785 A * 4/1981 Anderson ............... F16D 41/00
192/54.2
11,491,989 B2 * 11/2022 Ko ........................ B60W 30/19

* cited by examiner

*Primary Examiner* — Jacob D Knutson
*Assistant Examiner* — Mitchell James Price

(57) ABSTRACT

An obstacle-surmounting walking device is provided, and belongs to the technical field of walking devices. The obstacle-surmounting walking device includes a contact wheel, a driving load-bearing wheel, a free climbing wheel, a climbing drive disc, a climbing drive disc driving disengagement leaf, and a driving device. Contact wheel climbing teeth are arranged on contact wheel rim on the contact wheel, and contact wheel spokes of the contact wheel deviates from a center of the contact wheel rim. The driving load-bearing wheel is fixed on a driving wheel axle, and a bottom end of the driving load-bearing wheel is in contact with an inner surface of the contact wheel rim. A bottom end of the free climbing wheel is engaged with the contact wheel climbing teeth, the free climbing wheel can freely rotate around the driving wheel axle.

5 Claims, 2 Drawing Sheets

OBSTACLE-SURMOUNTING WALKING DEVICE

CROSS-REFERENCE TO RELATED APPLICATION

This patent application claims the benefit and priority of Chinese Patent Application No. 202311759972.4 filed with the China National Intellectual Property Administration on Dec. 20, 2023, the disclosure of which is incorporated by reference herein in its entirety as part of the present application.

TECHNICAL FIELD

The present disclosure relates to the technical field of walking devices, in particular to an obstacle-surmounting walking device, particularly a walking device in which a load-bearing function is separated from a climbing function, and the climbing function can be controlled by a disengagement or engagement of the cooperation between a driving wheel and a contact wheel.

BACKGROUND

On the basis of the Chinese invention patent ZL 202110039103.9 titled "SMOOTH OBSTACLE-SURMOUNTING WALKING MECHANISM", the present disclosure provides a working method for cooperation between the driving wheel and the contact wheel. In order to ensure a climbing ability of the smooth obstacle-surmounting walking mechanism (the smooth obstacle-surmounting walking mechanism in the Chinese invention patent ZL 202110039103.9 is configured as the specific components of the smooth obstacle-surmounting walking mechanism, the full text is incorporated in the present disclosure), gear meshing is required between the contact wheel and the driving wheel. Gear meshing, also served as a load-bearing mechanism, can cause vibration and impact, affecting the comfort of riding and also accelerating the abrasion of gears. And due to the influences such as external impact and vibration, changes in the meshing state of gears will cause changes in elevation, and even slipping, seriously affecting the ride experience. Therefore, the present disclosure provides a working method in which the load-bearing function is separated from the climbing function, and the climbing function can be controlled by a disengagement or engagement of the cooperation between the driving wheel and the contact wheel.

SUMMARY

In view of this, in order to achieve the purpose that the load-bearing function is separated from the climbing function and the climbing function can be controlled by a disengagement or engagement, the present disclosure provides an obstacle-surmounting walking device, wherein end face splines on the climbing drive disc are engaged with or disengaged from free climbing wheel end face splines so to achieve the purpose that the load-bearing function is separated from the climbing function the climbing function can be controlled by a disengagement or engagement.

In order to achieve the above-mentioned purpose, the present disclosure provides the following technical solution.

An obstacle-surmounting walking device includes:

- a contact wheel, the contact wheel being consisted of a contact wheel axle, contact wheel spokes, a contact wheel rim, and contact wheel climbing teeth arranged on inner side of contact wheel rim, the contact wheel axle being connected to the contact wheel rim through the contact wheel spokes, and the contact wheel spokes deviating from a center of the contact wheel rim, being arranged on one side, away from a vehicle body, of the contact wheel rim, and being configured for connecting the contact wheel axle with the contact wheel rim and providing support for the contact wheel rim through the contact wheel axle;
- a driving load-bearing wheel, the driving load-bearing wheel being fixed on a driving wheel axle, a bottom end of the driving load-bearing wheel being in contact with an inner surface of the contact wheel rim, and the driving load-bearing wheel being configured for bearing weight of the vehicle body transmitted by the driving wheel axle and capable of being driven by the driving wheel axle to rotate;
- a free climbing wheel, a bottom end of the free climbing wheel being engaged with the contact wheel climbing teeth and capable of freely rotating around the driving wheel axle, and free climbing wheel end face splines being arranged on an end face of the free climbing wheel;
- a climbing drive disc, end face splines on the climbing drive disc being engaged with the free climbing wheel end face splines, and the climbing drive disc being engaged with axial splines on the driving wheel axle and capable of moving axially in a direction of extension of the axial splines;
- a climbing drive disc driving disengagement leaf, one end of the climbing drive disk driving disengagement leaf being connected with the end face of the free climbing wheel, another end of the climbing drive disc driving disengagement leaf being connected with an end face of the climbing drive disc, and the climbing drive disc driving disengagement leaf being configured for disengaging the end face splines on the climbing drive disc from the free climbing wheel end face splines; and
- a driving device, the driving device being configured for driving the end face splines on the climbing drive disc to be engaged with the free climbing wheel end face splines.

Preferably, the driving wheel axle is a hollow driving wheel axle.

Preferably, the driving device includes:

- a climbing drive disc thrust bearing, the climbing drive disc thrust bearing being sleeved on the hollow driving wheel axle and being configured for pushing the end face splines on the climbing drive disc to be engaged with the free climbing wheel end face splines;
- an axially pulled climbing engagement disc, the axially pulled climbing engagement disc being close to one end, away from the climbing drive disc, of the climbing drive disc thrust bearing; and
- an engagement disc pulling rod, the engagement disc pulling rod penetrating through the hollow driving wheel axle and being fixed through bearings, one end of the engagement disc pulling rod being connected with the axially pulled climbing engagement disc, and the engagement disc pulling rod being configured for driving the axially pulled climbing engagement disc to push the climbing drive disc thrust bearing or be separated from the climbing drive disc thrust bearing so that the end face splines on the climbing drive disc are engaged with the free climbing wheel end face splines.

Preferably, the driving wheel axle is a solid driving wheel axle.

In the present disclosure, the driving device includes:

a climbing drive disc thrust bearing, the climbing drive disc thrust bearing being sleeved on the solid driving wheel axle and being configured for pushing the end face splines on the climbing drive disc to be engaged with the free climbing wheel end face splines; and an axially pressed climbing engagement disc, the axially pressed climbing engagement disc being sleeved on the solid driving wheel axle, being located outside the climbing drive disc thrust bearing, and being driven by a driving mechanism to push the end face splines on the climbing drive disc to be engaged with the free climbing wheel end face splines.

According to the obstacle-surmounting walking device provided in the present disclosure, the end face splines on the climbing drive disc are engaged with or disengaged from the free climbing wheel end face splines so to achieve the purpose that the load-bearing function is separated from the climbing function, and the climbing function can be controlled by a disengagement or engagement.

Reference signs in attached figures: 1, contact wheel axle; 2, contact wheel spoke; 3; contact wheel rim; 4, contact wheel climbing tooth; 5, hollow driving wheel axle; 6, solid driving wheel axle; 7, driving load-bearing wheel; 8, free climbing wheel; 9, free climbing wheel end face spline; 10, climbing drive disc; 11, climbing drive disc thrust bearing; 12, axially pulled climbing engagement disc; 13, axially pressed climbing engagement disc; 14, climbing drive disc driving disengagement leaf; 15, bearing; and 16, engagement disc pulling rod.

DETAILED DESCRIPTION OF THE EMBODIMENTS

The following clearly and completely describes the technical scheme in the embodiments of the present disclosure with reference to the accompanying drawings in the embodiments of the present disclosure; apparently, the described embodiments are merely a part rather than all of the embodiments of the present disclosure. All other embodiments obtained by those skilled in the art based on the embodiments of the present disclosure without creative efforts shall fall within the protection scope of the present disclosure.

In the description of the present disclosure, it needs to be illustrated that the indicative direction or position relations of the terms such as “upper”, “lower”, “inner”, “outer” and “top/bottom end” are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

In the description of the present disclosure, it needs to be illustrated that, except as otherwise noted, the terms such as “install”, “provided with”, “sleeving/sleeve connection” and “connect” should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally. For those skilled in the art, the specific meanings of the terms in the present disclosure can be understood according to specific conditions.

Figure 1:
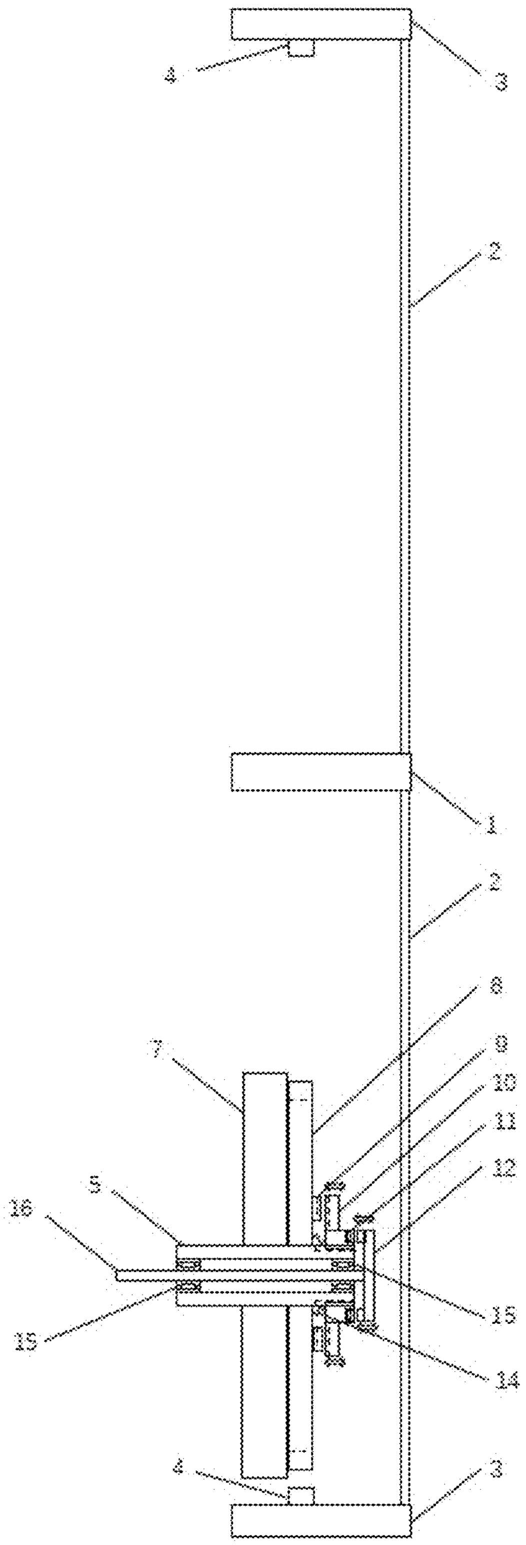
FIG. 1 is a structural schematic diagram of an embodiment of an obstacle-surmounting walking device provided in the present disclosure.
Figure 2:
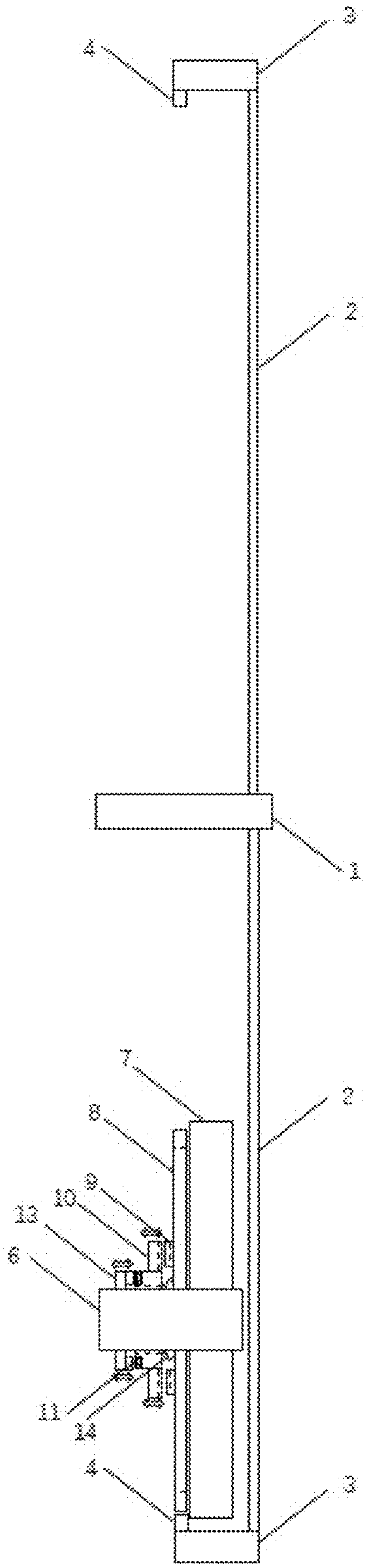
FIG. 2 is a structural schematic diagram of another embodiment of an obstacle-surmounting walking device provided in the present disclosure.

As shown in FIG. 1 to FIG. 2, the present disclosure provides an obstacle-surmounting walking device, including:

a contact wheel, the contact wheel being consisted of a contact wheel axle 1, contact wheel spokes 2, a contact wheel rim 3, and contact wheel climbing teeth 4 arranged on the inner side of the contact wheel rim 3, the contact wheel axle 1 being connected to the contact wheel rim 3 through the contact wheel spokes 2, and the contact wheel spokes 2 deviating from a center of the contact wheel rim 3, being arranged on one side, away from a vehicle body, of the contact wheel rim 3, and being configured for connecting the contact wheel axle 1 with the contact wheel rim 3 and providing support for the contact wheel rim 3 through the contact wheel axle 1;

a driving load-bearing wheel 7, the driving load-bearing wheel 7 being fixed on a driving wheel axle, a bottom end of the driving load-bearing wheel 7 being in contact with an inner surface of the contact wheel rim 3, and the driving load-bearing wheel 7 being configured for bearing weight of the vehicle body transmitted by the driving wheel axle and capable of being driven by the driving wheel axle to rotate;

a free climbing wheel 8, a bottom end of the free climbing wheel 8 being engaged with the contact wheel climbing teeth 4 and capable of freely rotating around the driving wheel axle, and free climbing wheel end face splines 9 being arranged on an end face of the free climbing wheel 8;

wherein, the driving load-bearing wheel 7 and the free climbing wheel 8 are the parts of a driving wheel in contact with a contact wheel in the Chinese invention patent ZL 202110039103.9;

a climbing drive disc 10, end face splines on the climbing drive disc 10 being engaged with the free climbing wheel end face splines 9, and the climbing drive disc 10 being engaged with axial splines on the driving wheel axle and capable of moving axially in a direction of extension of the axial splines;

a climbing drive disc driving disengagement leaf 14, one end of the climbing drive disk driving disengagement leaf 14 being connected with the end face of the free climbing wheel 8, another end of the climbing drive disc driving disengagement leaf 14 being connected with an end face of the climbing drive disc 10, and the climbing drive disc driving disengagement leaf 14 being configured for disengaging the end face splines on the climbing drive disc 10 from the free climbing wheel end face splines 9; and a driving device, the driving device being configured for driving the end face splines on the climbing drive disc 10 to be engaged with the free climbing wheel end face splines 9.

In the obstacle-surmounting walking device provided by the present disclosure, the driving load-bearing wheel 7 and the inner surface of the contact wheel rim 3 are in a smooth rolling relationship, and the free climbing wheel 8 can freely rotate around the driving wheel axle, thus, when the meshing state between the free climbing wheel 8 and the contact wheel climbing teeth 4 is changed due to vibration or impact, the free climbing wheel 8 can freely rotate to find a new engagement point without affecting the riding experience.

In the present disclosure, the free climbing wheel end splines 9 are engaged with the end face splines on the climbing drive disc 10. The climbing drive disc 10 is engaged with the axial splines on the driving wheel axle, the climbing drive disc 10 can move axially along the axial splines on the hollow driving wheel axle 5 or the solid driving wheel axle 6, and the climbing drive disc 10 rotates synchronously with the hollow driving wheel axle 5 or the solid driving wheel axle 6 through the engagement of the splines.

The present disclosure provides the following two driving devices. The two driving devices are configured for driving the end face splines on the climbing drive disc 10 to be engaged with or disengaged from the free climbing wheel end face splines 9 so as to achieve the purpose that a load-bearing function is separated from a climbing function, and the climbing function can be controlled by a disengagement or engagement.

The first driving device is as shown in FIG. 1, and the driving wheel axle is a hollow driving wheel axle 5.

In the present disclosure, the driving device includes:

- a climbing drive disc thrust bearing 11, the climbing drive disc thrust bearing 11 being sleeved on the hollow driving wheel axle 5 and being configured for pushing the end face splines on the climbing drive disc 10 to be engaged with the free climbing wheel end face splines 9; and
- an axially pulled climbing engagement disc 12, the axially pulled climbing engagement disc 12 being close to one end, away from the climbing drive disc 10, of the climbing drive disc thrust bearing 11; and
- an engagement disc pulling rod 16, the engagement disc pulling rod 16 penetrating through the hollow driving wheel axle 5 and being fixed through bearings 15, one end of the engagement disc pulling rod 16 being connected with the axially pulled climbing engagement disc 12, and the engagement disc pulling rod 16 being configured for driving the axially pulled climbing engagement disc 12 to push the climbing drive disc thrust bearing or be separated from the climbing drive disc thrust bearing 11 so that the end face splines on the climbing drive disc 10 are engaged with the free climbing wheel end face splines 9.

The second driving device is as shown in FIG. 2, and the driving wheel axle is a solid driving wheel axle 6.

In the present disclosure, the driving device includes:

- a climbing drive disc thrust bearing 11, the climbing drive disc thrust bearing 11 being sleeved on the solid driving wheel axle 6 and being configured for pushing the end face splines on the climbing drive disc 10 to be engaged with the free climbing wheel end face splines 9; and
- an axially pressed climbing engagement disc 13, the axially pressed climbing engagement disc 13 being sleeved on the solid driving wheel axle 6, being located outside the climbing drive disc thrust bearing 11, and being driven by a driving mechanism to push the end face splines on the climbing drive disc 10 to be engaged with or separated from the free climbing wheel end face splines 9.

The relationship between the present disclosure and a smooth obstacle-surmounting walking mechanism with the patent number of ZL 202110039103.9 is described as follows.

In the smooth obstacle-surmounting walking mechanism with the patent number of ZL 202110039103.9, the relationship between the driving wheel and the contact wheel is only that the contact wheel is compressed by the driving wheel under the action of the weight of the vehicle body, and the relationship between the driving wheel and the contact wheel is only a rolling friction relationship. In the present disclosure, the driving wheel in the smooth obstacle-surmounting walking mechanism with the patent number of ZL 202110039103.9 is refined and specialized into a driving load-bearing wheel 7 and a free climbing wheel 8. The driving load-bearing wheel 7 has a load-bearing function and a rolling friction function, and the free climbing wheel 8 has a special climbing anti-skid function. The climbing anti-skid function of the free climbing wheel 8 can be controlled through a disengagement or engagement. When the climbing function is not activated, the free climbing wheel 8 can freely rotate around the hollow driving wheel axle 5 or the solid driving wheel axle 6 so as to prevent vibration and even skidding caused by changes in the meshing state of the climbing teeth.

The working process is as follows.

The part of the driving wheel in contact with the contact wheel includes a driving load-bearing wheel 7 and a free climbing wheel 8, wherein the driving load-bearing wheel 7 is fastened to the hollow driving wheel axle 5 or the solid driving wheel axle 6, and the free climbing wheel 8 can freely rotate around the hollow driving wheel axle 5 or the solid driving wheel axle 6. The free climbing wheel 8 is engaged with the contact wheel climbing teeth 4 on the contact wheel rim 3, and the driving load-bearing wheel 7 is in contact with the inner surface of the contact wheel rim 3, is responsible for bearing the weight of the vehicle body transmitted by the hollow driving wheel axle 5 or the solid driving wheel axle 6, and can be driven by the hollow driving wheel axle 5 or the solid driving wheel axle 6 to rotate. The driving load-bearing wheel 7 rolls smoothly on the inner surface of the contact wheel rim 3, and the free climbing wheel 8 can freely rotate around the hollow driving wheel axle 5 or the solid driving wheel axle 6, thus, when the meshing state between the free climbing wheel 8 and the contact wheel climbing teeth 4 is changed due to vibration or impact, the free climbing wheel 8 can freely rotate to find a new engagement point without affecting the riding experience. Free climbing wheel end face splines 9 are arranged on the free climbing wheel 8. The free climbing wheel end face splines 9 can be engaged with the end face splines on the climbing drive disc 10. The climbing drive disc 10 is engaged with the axial splines on the hollow driving wheel axle 5 or the solid driving wheel axle 6, the climbing drive disc 10 can move axially along the axial splines on the hollow driving wheel axle 5 or the solid driving wheel axle 6, and the climbing drive disc 10 rotates synchronously with the hollow driving wheel axle 5 or the solid driving wheel axle 6 under the engagement of the splines. When the climbing function is not activated, the climbing drive disc 10 is driven by the climbing drive disc driving disengagement leaf 14 to be disengaged from the free climbing wheel end face splines 9, and the free climbing wheel 8 can rotate freely to automatically eliminate the elevation change and vibration impact caused by the changes in the engagement state between the free climbing wheel 8 and the contact wheel climbing teeth 4. When the climbing function is required to be activated during ascending and descending the stairs, the climbing drive disc 10 is close to the free climbing wheel end face splines 9 and is engaged with the free climbing wheel end face splines 9 when the climbing drive disc thrust bearing 11 is pushed by the axially pulled climbing engagement disc 12 or the axially pressed climbing engagement disc 13. Under the engagement of the climbing drive disc 10, the free climbing wheel 8 rotates synchronously with the hollow driving wheel axle 5 or the solid driving wheel axle 6, and provides a climbing ability through the engagement with the contact wheel climbing teeth 4, so that the problem of skidding that may occur when the driving load-bearing wheel 7 climbs is solved. Wherein, there are two ways of realizing the climbing engagement disc. On one hand, the climbing engagement disc is an axially pulled climbing engagement disc 12. The axially pulled climbing engagement disc 12 is matched with the hollow driving wheel axle 5. The movement of the axially pulled climbing engagement disc 12 is controlled by the engagement disc pulling rod 16. The engagement disc pulling rod 16 penetrates through the hollow driving wheel axle 5 and is fixed by the bearing 15. On the other hand, the climbing engagement disc is an axially pressed climbing engagement disc 13. The axially pressed climbing engagement disc 13 is matched with the solid driving wheel axle 6, and can be pushed by other external mechanical pushing mechanisms to move.

The above mentioned are only preferred specific embodiments of the present disclosure. However, the scope of protection of the present disclosure is not limited to the embodiments described herein. Any technicians skilled in the technical field are within the technical scope disclosed by the present disclosure; and any replacements or modifications according to the technical schemes of the present disclosure and ideas thereof all shall be included in the scope of protection of the present disclosure.

What is claimed is:

1. An obstacle-surmounting walking device, comprising:

a contact wheel, the contact wheel being consisted of a contact wheel axle, contact spokes, a contact wheel rim, and contact wheel climbing teeth arranged on inner side of contact wheel rim, the contact wheel axle being connected to the contact wheel rim through the contact wheel spokes, and the contact wheel spokes deviating from a center of the contact wheel rim, being arranged on one side, away from a vehicle body, of the contact wheel rim, and being configured for connecting the contact wheel axle with the contact wheel rim and providing support for the contact wheel rim through the contact wheel axle;

a driving load-bearing wheel, the driving load-bearing wheel being fixed on a driving wheel axle, a bottom end of the driving load-bearing wheel being in contact with an inner surface of the contact wheel rim, and the driving load-bearing wheel being configured for bearing weight of the vehicle body transmitted by the driving wheel axle and capable of being driven by the driving wheel axle to rotate;

a free climbing wheel, a bottom end of the free climbing wheel being engaged with the contact wheel climbing teeth and capable of freely rotating around the driving wheel axle, and free climbing wheel end face splines being arranged on an end face of the free climbing wheel;

a climbing drive disc, end face splines on the climbing drive disc being engaged with the free climbing wheel end face splines, and the climbing drive disc being engaged with an axial splines on the driving wheel axle and capable of moving axially in a direction of extension of the axial splines;

a climbing drive disc driving disengagement leaf, one end of the climbing drive disk driving disengagement leaf being connected with the end face of the free climbing wheel, another end of the climbing drive disc driving disengagement leaf being connected with an end face of the climbing drive disc, and the climbing drive disc driving disengagement leaf being configured for disengaging the end face splines on the climbing drive disc from the free climbing wheel end face splines; and a driving device, the driving device being configured for driving the end face splines on the climbing drive disc to be engaged with the free climbing wheel end face splines.

2. The obstacle-surmounting walking device according to claim 1, wherein the driving wheel axle is a hollow driving wheel axle.

3. The obstacle-surmounting walking device according to claim 2, wherein the driving device comprises:

a climbing drive disc thrust bearing, the climbing drive disc thrust bearing being sleeved on the hollow driving wheel axle and being configured for pushing the end face splines on the climbing drive disc to be engaged with the free climbing wheel end face splines;

an axially pulled climbing engagement disc, the axially pulled climbing engagement disc being close to one end, away from the climbing drive disc, of the climbing drive disc thrust bearing; and an engagement disc pulling rod, the engagement disc pulling rod penetrating through the hollow driving wheel axle and being fixed through bearings, one end of the engagement disc pulling rod being connected with the axially pulled climbing engagement disc, and the engagement disc pulling rod being configured for driving the axially pulled climbing engagement disc to push the climbing drive disc thrust bearing or be separated from the climbing drive disc thrust bearing so that the end face splines on the climbing drive disc are engaged with the free climbing wheel end face splines.

4. The obstacle-surmounting walking device according to claim 1, wherein the driving wheel axle is a solid driving wheel axle.

5. The obstacle-surmounting walking device according to claim 4, wherein the driving device comprises:

a climbing drive disc thrust bearing, the climbing drive disc thrust bearing being sleeved on the solid driving wheel axle and being configured for pushing the end face splines on the climbing drive disc to be engaged with the free climbing wheel end face splines; and an axially pressed climbing engagement disc, the axially pressed climbing engagement disc being sleeved on the solid driving wheel axle, being located outside the climbing drive disc thrust bearing, and being driven by a driving mechanism to push the end face splines on the climbing drive disc to be engaged with the free climbing wheel end face splines.

* * * * *